US006458444B1

(12) United States Patent
Natsuhara et al.

(10) Patent No.: US 6,458,444 B1
(45) Date of Patent: Oct. 1, 2002

(54) CERAMIC SUBSTRATE AND POLISHING METHOD THEREOF

(75) Inventors: Masuhiro Natsuhara; Hirohiko Nakata; Motoyuki Tanaka; Yasuhisa Yushio, all of Itami (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/275,478

(22) Filed: Mar. 24, 1999

(30) Foreign Application Priority Data

Mar. 24, 1998 (JP) .......................................... 10-075208
Jan. 28, 1999 (JP) .......................................... 11-019727

(51) Int. Cl.[7] .......................... G03G 15/20; B32B 3/26
(52) U.S. Cl. ...................... 428/141; 428/148; 428/215; 428/220; 428/213; 428/332; 428/337; 428/338; 428/698; 399/338; 399/335; 219/216
(58) Field of Search ................................ 428/141, 148, 428/215, 220, 213, 332, 337, 338, 698; 399/338, 335; 219/216

(56) References Cited

U.S. PATENT DOCUMENTS 5,165,983 A * 11/1992 Sugiura et al. ............. 428/141
5,616,426 A * 4/1997 Tenhover et al. ........... 428/688
6,045,716 A * 4/2000 Walsh et al. .................. 216/88

FOREIGN PATENT DOCUMENTS

JP 58-192745 11/1983
JP 60 044259 3/1985

* cited by examiner

*Primary Examiner*—William P. Watkins, III
(74) *Attorney, Agent, or Firm*—W. F. Fasse; W. G. Fasse

(57) ABSTRACT

The circumferential edge portion of a ductile rotating body containing abrasive grains is used to polish the surface of a ceramic substrate. The angle θ formed between the polished direction $D_0$ of the ceramic substrate and the rotating direction $D_1$ of the rotating body is set in the range from 10° to 80° for the polishing step. Alternatively, the polishing process is divided into at least two steps, and the average grain size of abrasive grains is reduced stepwise in the successive steps of the polishing process. According to this method, the surface of a large-area and thin ceramic substrate can be polished without damage, and a smooth polished ceramic surface can be provided. This method is particularly suitable for polishing a ceramic substrate having a thickness of at most 2.0 mm, and the resulting polished ceramic substrate is suitable for a ceramic heater in a thermal fixation device for fixing a toner image.

16 Claims, 8 Drawing Sheets

CERAMIC SUBSTRATE AND POLISHING METHOD THEREOF

BACKGROUND OF THE INVENTION

1. Field of the Invention

The present invention relates to ceramic substrates having a polished surface with high surface smoothness and methods of polishing such ceramic substrates, and more particularly, to a ceramic substrate for use in a thermal fixation device for toner image such as a copying machine and a printer and a method of polishing such a ceramic substrate.

2. Description of the Background Art

Conventionally, when a ceramic material is used for various purposes, in general, the surface of the ceramic material should be polished or ground into smoothness. There have been various proposed methods of smoothing a ceramic surface depending upon the shape, use, required smoothness and the like of the ceramic material.

On typical method of polishing a ceramic material is barrel-polishing, according to which a ceramic material and an abrasive are put together into a container to polish the ceramic material by rotation or vibration, and Japanese Patent Laying-Open No. 58-192745 for example discloses a method of polishing a ceramic element by a vibrating barrel using a pier-shaped abrasive.

Other methods of treating a ceramic surface include lapping, honing, and grinding. These methods employ hone or abrasive grains to pressurize the ceramic material to be treated and the surface is ground.

The conventional, typical methods of polishing or grinding described above are suitable for treating relatively small and thick ceramic elements, but are not appropriate for smoothing the surface of a ceramic substrate having a large area and a relatively small thickness such as a substrate for a ceramic heater in a thermal fixation device for toner image.

In barrel-polishing, for example, a thin ceramic substrate is sometimes destroyed by a grinder during rotation or vibration. In lapping, honing, and grinding, a ceramic substrate is prone to cracking, because a prescribed pressure is applied between abrasive grains or a grinder used and the ceramic material.

The lapping, honing, grinding or the like requests that the untreated surface must be ground as much as 0.1 to 0.2 mm in order to eliminate variations in the surface smoothness by the working. Therefore, a ceramic substrate having a thickness larger than a finished product by the margin for working should be prepared, which increases the material cost.

SUMMARY OF THE INVENTION

The present invention is directed to a solution to the problem, and it is an object of the present invention to provide a ceramic substrate having a large area, a relatively small thickness and a smooth surface such as a ceramic substrate for use in a ceramic heater in a thermal fixation device for toner image and to provide a method of polishing the surface of such a ceramic substrate having a large area and a relatively small thickness into smoothness without damaging the surface.

In order to achieve the above-described object, a method of polishing a ceramic substrate according to the present invention uses a ductile rotating body containing abrasive grains, and the surface of the ceramic substrate is polished by the circumferential portion of the rotating body. This polishing method is preferable for polishing a thin ceramic substrate, particularly, a ceramic substrate as thin as 2.0 mm or less.

In the method of polishing a ceramic substrate, the direction orthogonal to the rotating axis of the rotating body is preferably inclined by an angle in the range from 10° to 80° relative to the direction of polishing the ceramic substrate. If this angle is smaller than 10° or larger than 80°, a line is impressed on the ceramic substrate by the abrasive grains, and the surface roughness is relatively increased.

The polishing process may be divided into two or more steps and the average grain size of abrasive grains contained in the rotating body may be reduced stepwise.

A ceramic substrate resulting from the polishing as described above has at least one surface polished, which surface is formed by a substantially flat portion and a recessed portion remaining in the flat portion.

Such a ceramic substrate is suitable for a ceramic substrate having a large area and a relatively small thickness such as a substrate for a ceramic heater used in a thermal fixation device for toner image. The flat portion herein includes a microscopically small irregularities.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

According to the present invention, the surface of a ceramic substrate is polished using the circumferential portion of a columnar- or disc-shaped, ductile rotating body containing abrasive grains. The rotating body has only to be able to hold abrasive grains and be ductile, and woven or nonwoven fabric, plastic foam (foamed plastic or sponge), rubber foam (rubber sponge) or the like is preferable. Such a material forming the rotating body is extremely easily deformed by pressure as compared to a conventional grinder or abrasive used in barrel-polishing.

The abrasive grains contained in the rotating body may be conventional abrasive grains such as alumina and silicon carbide.

Figure 1:
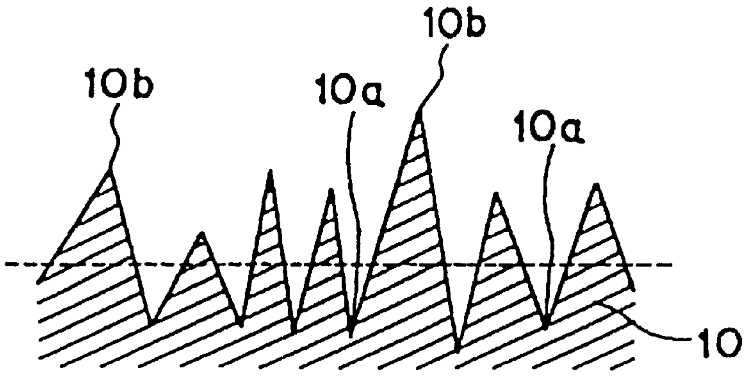
FIG. 1 is a schematic conceptual view of a cross section of a ceramic substrate before it is polished, for illustrating the surface state.
Figure 2:
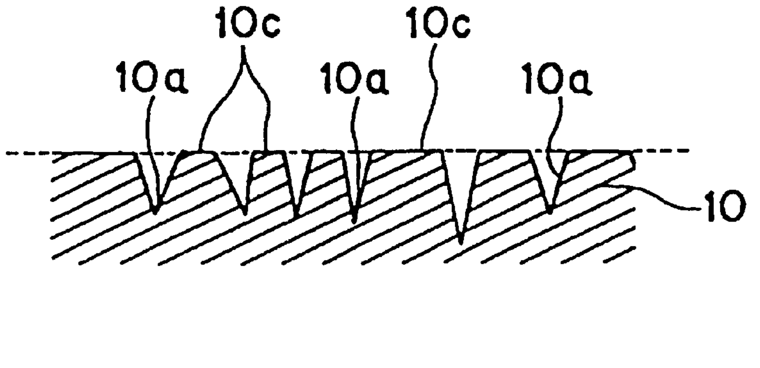
FIG. 2 is a schematic conceptual view of a cross section of a ceramic substrate after it has been polished by a polishing method according to the present invention, for illustrating the surface state.
Figure 6:
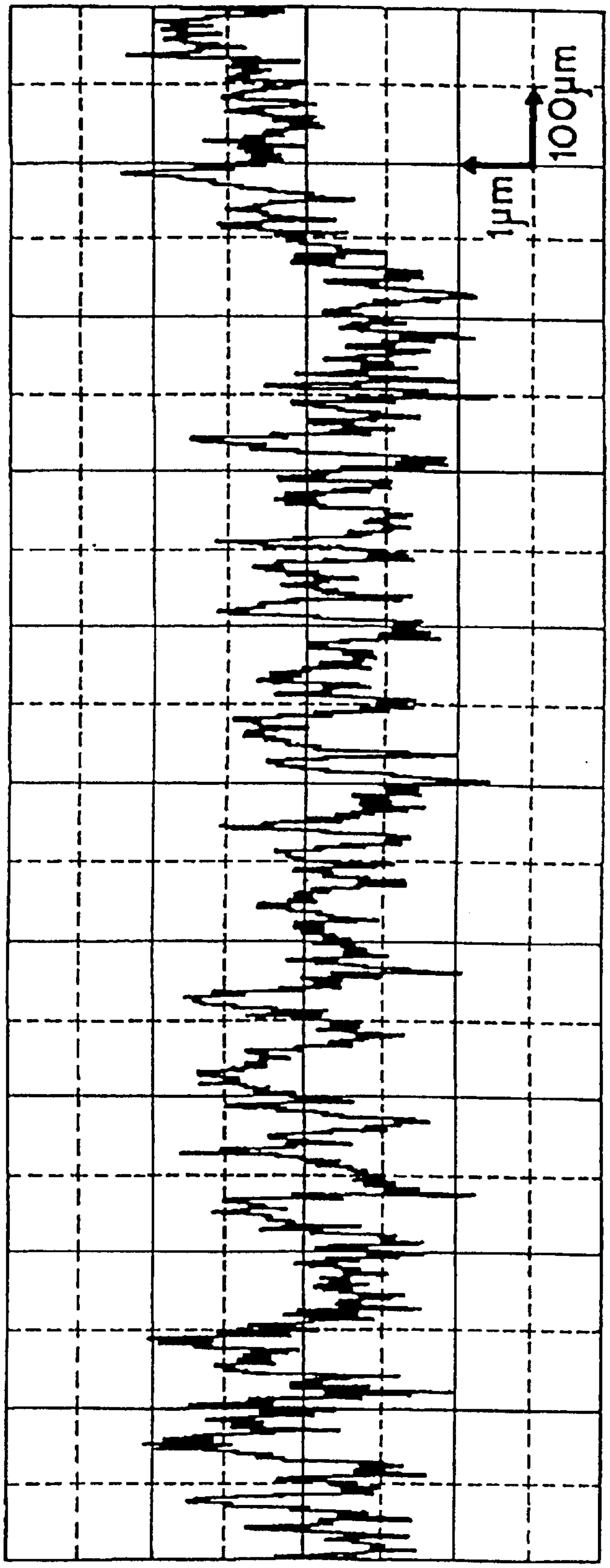
FIG. 6 PRIOR ART
FIG. 6 is a graph of the roughness curve of the surface of an aluminum nitride sintered body before being polished.

Typically, there are recessed portions 10_a_ and raised portions 10_b_ as shown in FIG. 1 on the surface of a ceramic substrate formed of a sintered body, and the amplitude of the maximum irregularities is sometimes over 10 μm. As an example of an aluminum nitride sintered body having such large irregularities on the surface, the surfaces roughness curve of a sintered body having a center line average height Ra of 0.78 μm before polishing based on the Japanese Industrial Standard (JIS R 1600) and a maximum height Rmax of 9.7 μm based on the standard is shown in FIG. 6.

By the polishing method according to the present invention, since the rotating body is ductile, the circumferential portion of the rotating body deforms toward the center when it is pressed against the ceramic surface. Thus, only raised portions 10_b_ of the ceramic substrate 10 are polished, while the recessed portions 10_a_ are not polished, as shown in FIG. 1.

Figure 7:
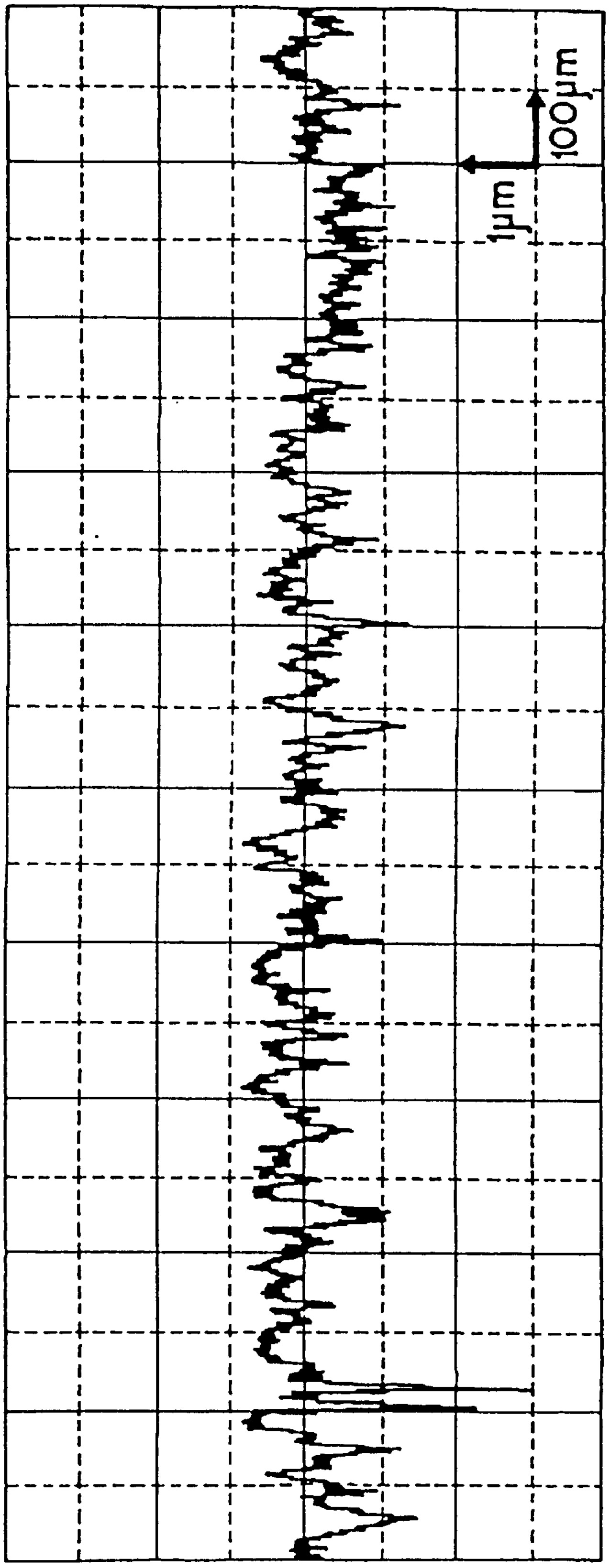
FIG. 7 is a graph of the roughness curve of the surface of the aluminum nitride sintered body shown in FIG. 6 after being polished by a method according to the present invention.

The resulting polished surface microscopically includes substantially flat portions 10_c_ and recessed portions 10_a_ remaining between flat portions 10_c_, so that a relatively smooth polished surface with a small irregularity amplitude can result for a smaller amount of polishing. For 7 is a surface roughness curve resulting after polishing an aluminum nitride sintered body having a surface roughness shown in FIG. 9 using a rotating body containing abrasive grains of alumina ($Al_2O_3$)-based ceramic which passes through a #320 mesh screen (hereinafter "#320 mesh-pass") by a method according to the present invention. In FIG. 7, center line average height Ra is 0.34 μm and maximum height Rmax is 5.4 μm.

Note that "#320 mesh" refers to a mesh having 320 openings per linear inch. The size of the actual mesh is obtained by subtracting the wire size forming the mesh from the value obtained by dividing one inch by 320. This also applies to #80 mesh, #150 mesh, #600 mesh, and #1000 mesh in the following description.

As compared to such polishing according to the present invention, the conventional barrel-polishing mainly removes raised portions but removes recessed portions as well, and the raised and recessed portions are generally rounded off in polishing. Lapping, honing and grinding trim the entire surface regardless of the surface irregularities, and the resulting polished surface has impressions caused by hard abrasive grains or the like, a large number of recessed and raised portions of a small amplitude remain microscopically.

Figure 8:
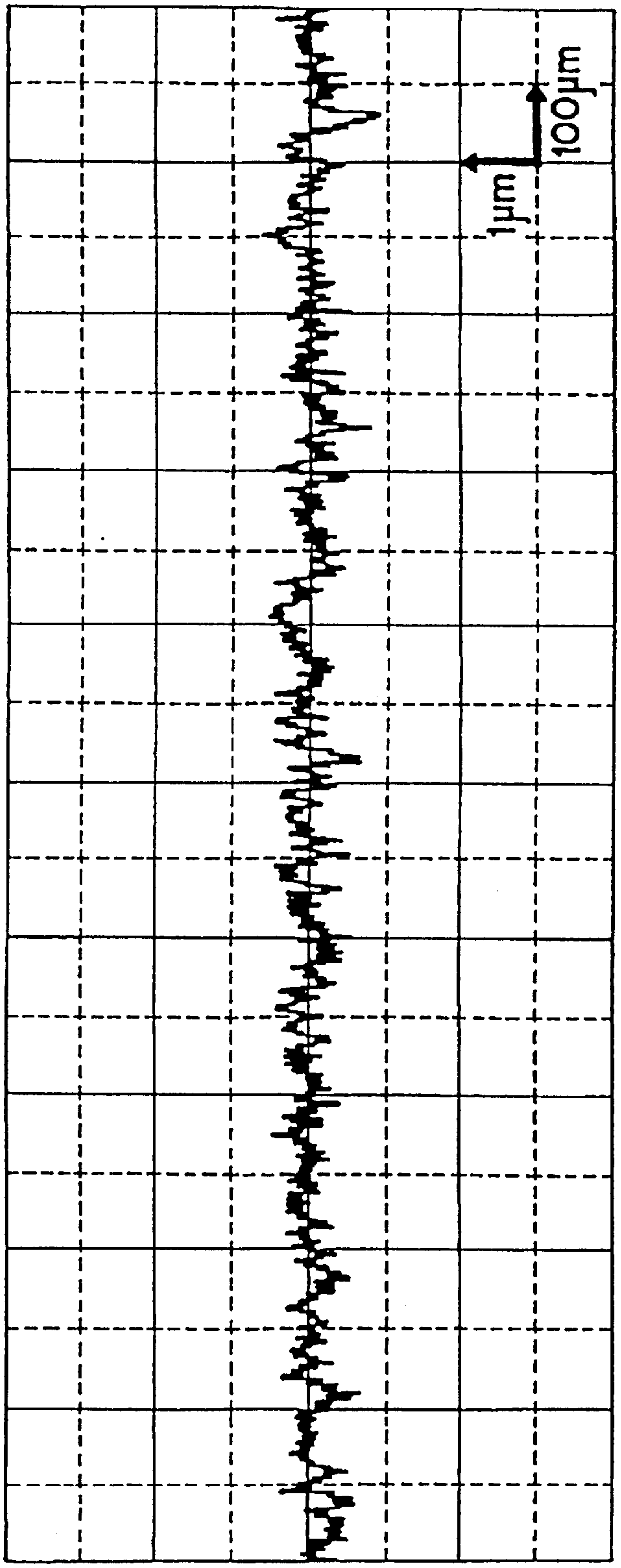
FIG. 8 PRIOR ART
FIG. 8 is a graph of the roughness curve of the surface of the aluminum nitride sintered body shown in FIG. 6 after being barrel-polished.
Figure 9:
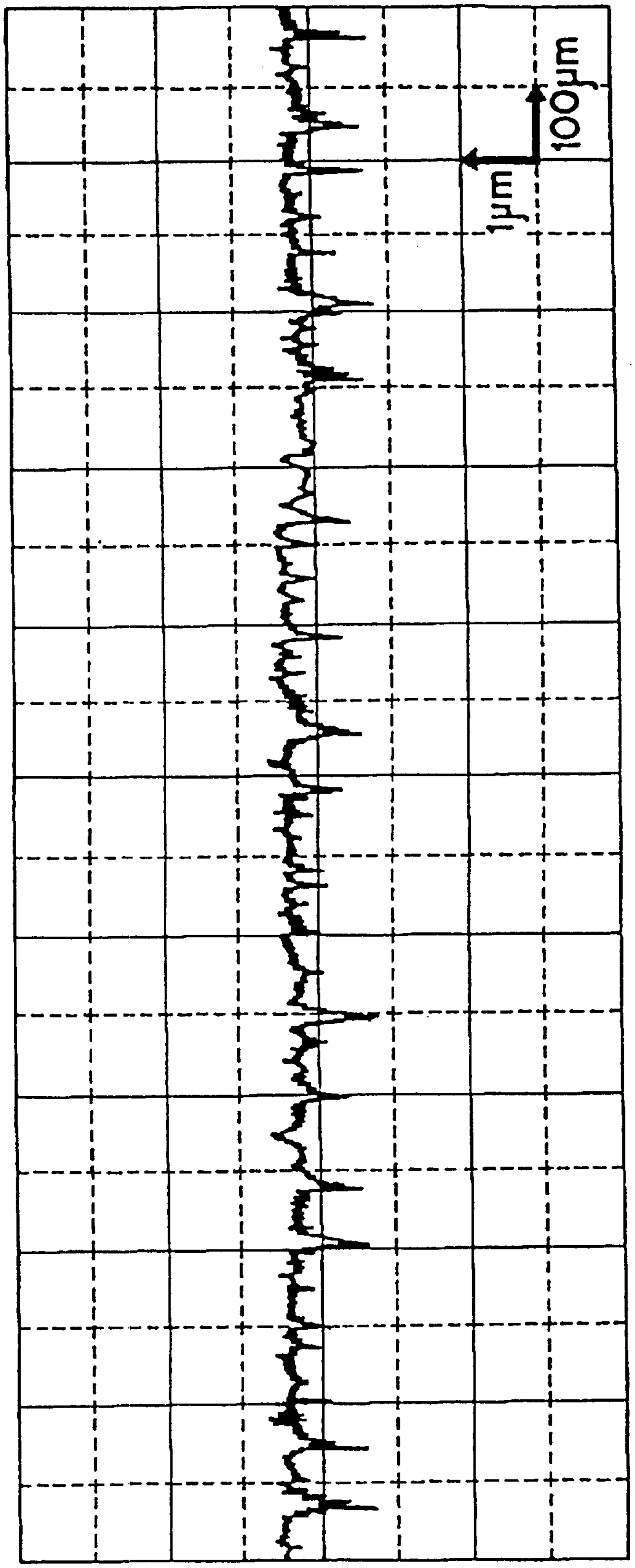
FIG. 9 PRIOR ART
FIG. 9 is a graph of the roughness curve of the surface of the aluminum nitride sintered body shown in FIG. 6 after being lapped.

The roughness curves of a barrel-polished product and a lapped product are given in FIGS. 8 and 9 as examples of such a polished surface. The roughness curve in FIG. 8 corresponds to a surface resulting by barrel-polishing the surface of an aluminum nitride sintered body in FIG. 6 by a #320-GC (Green Carbon) barrel stone, and the roughness curve in FIG. 9 corresponds to a surface resulting from lapping using a GC hone having a similar roughness.

As can be seen from comparison between the polished surface according to the present invention shown in FIG. 7 and the barrel-polished surface in FIG. 8, although both are polished surfaces removed of raised portions of the original sintered body, they appear quite different. More specifically, the width of the flat portion of the polished surface (the width in the abscissa direction of the roughness curve) after the raised portion is removed is smaller than that by the barrel-polishing. The recessed portion is shallow according to the barrel-polishing.

Furthermore, in the conventional barrel-polishing and lapping, a ceramic substrate is in point-contact with a home or abrasive grains, a large pressure is locally applied upon the ceramic substrate. If the loaded pressure is too large, the shoulder of a corner portion of the ceramic substrate is prone to be broken, rounded off, or chip. A relatively thin substrate could be cracked, in other words, the local concentration of pressure could damage the substrate. In a normal grinding, the substrate is ground as much as 0.1 to 0.2 mm thickness-wise in order to avoid variations in grinding, a very large material loss is inevitable.

Meanwhile, the rotating body used according to the present invention is ductile and easily deforms when it is pressed against a ceramic substrate to be in plane-contact with the ceramic surface. As a result, the pressure upon the surface being polished is dispersed within each part of the ceramic substrate, which prevents the local concentration of pressure, and the ceramic substrate will be hardly damaged.

Therefore, by the polishing method according to the present invention, the pressure can be dispersed relatively evenly within a wide range of the surface being polished, a corner portion of the substrate will not be broken or rounded off, deformation such as cracks and chipping at the portion can be prevented and cracks in the substrate itself can be prevented so that the method is preferable for polishing a thin ceramic substrate, particularly a substrate having a thickness equal to or smaller than 2.0 mm. In addition, the deformation of the rotating body and even distribution of abrasive grains reduce variations in the polishing and almost no material loss is caused.

By the polishing method according to the present invention, the polishing process is divided into a number of steps, and the average grain size of abrasive grains contained in the rotating body is reduced stepwise, and therefore the surface roughness of the resulting polished surface can be even further reduced. More specifically, the surface is polished first using a rotating body containing abrasive grains having a large average grain size. Since the average grain size is large, the polishing force is large accordingly, and large raised portions present on the surface are removed. Subsequently, rotating bodies each containing abrasive grains having an average grain size smaller than the previous polishing step are used for repeating the polishing.

For example, the grain size of abrasive grains contained in the rotating body is set as #80 mesh-pass first, then #150 mesh-pass next, followed by #320 mesh-pass sequentially, so that small raised portions which cannot removed in a polishing step can be removed in the following steps.

Figure 10:
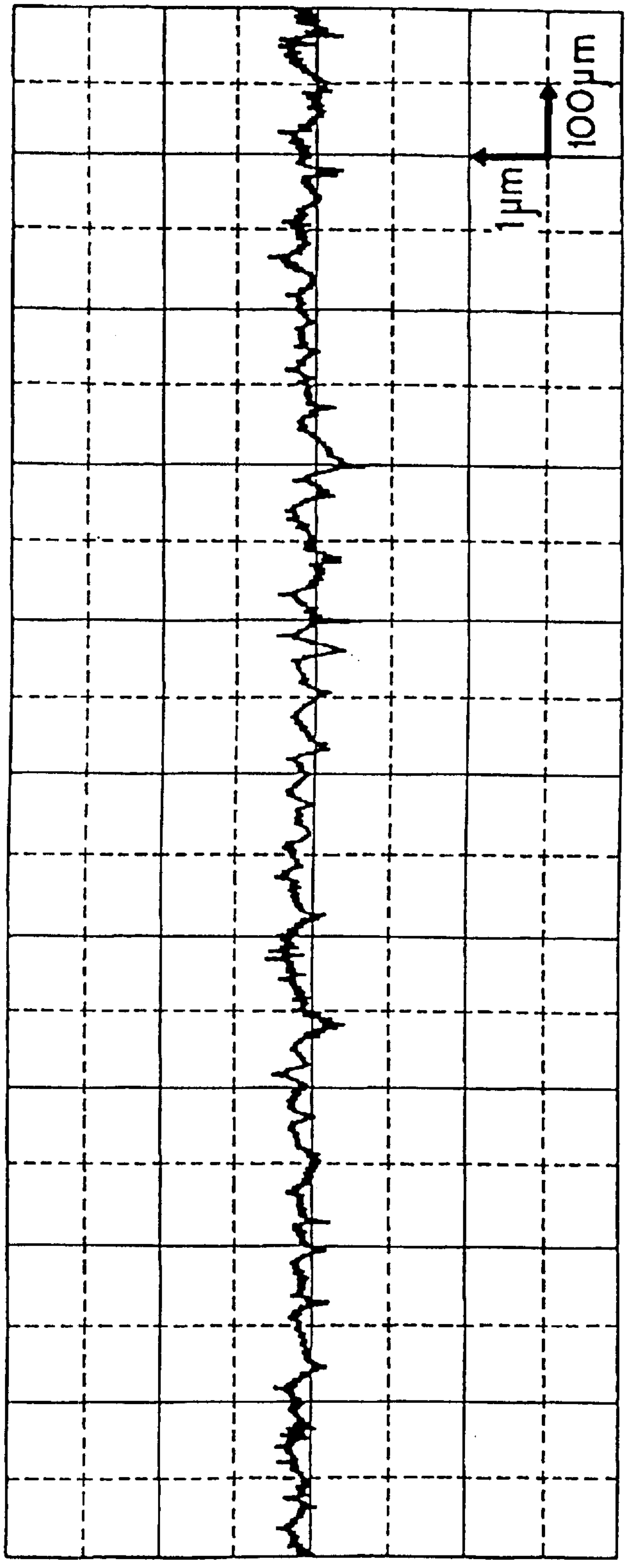
FIG. 10 is a graph of the roughness curve of the surface of the aluminum nitride sintered body shown in FIG. 6 after being polished through multiple stages by a method according to the present invention.

FIG. 10 shows the roughness curve of a surface formed by polishing the surface of an aluminum nitride sintered body having the surface state shown in FIG. 6 in the multiple steps, and center line average height Ra is 0.16 μm and Rmax is 1.5 μm. By such multi-step polishing, the surface to be polished can be prevented from being damaged using the ductile rotating body, while the surface roughness of the polished surface can be more reduced.

Figure 3:
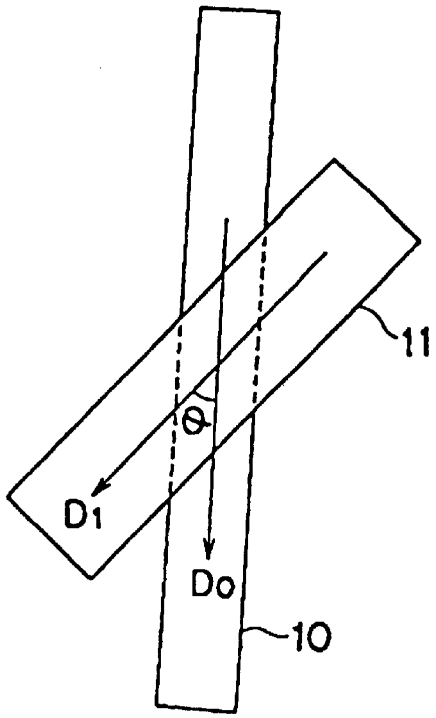
FIG. 3 is a schematic plan view for use in illustration of the relation of the advancing direction of a ceramic substrate and the rotating direction of a rotating body when the ceramic substrate is polished using the rotating body by a polishing method according to the present invention.

In a polishing operation, a ceramic substrate is moved while the surface is contacted to the rotating body. At this time, as shown in FIG. 3 polishing is preferably performed such that the direction (rotating direction) $D_1$ orthogonal to the rotating axis of rotating body 11 is inclined relative to the polishing direction $D_0$ of ceramic substrate 10. If polishing direction $D_0$ and rotating direction $D_1$ are the same, impressions caused by abrasive grains are formed linearly on ceramic substrate 10, and the surface roughness is relatively increased. Meanwhile, if prescribed angle θ is formed between polishing direction $D_0$ and rotating direction $D_1$, linear impressions will not be formed, and a smoother polished surface results. Angle θ is preferably in the range from 10° to 80° and more preferably in the range from 30° to 60°.

The polished surface of a ceramic substrate obtained by the above described polishing method according to the present invention includes flat portions and recessed portions therebetween. The flat portions have an average width in the range from several μm to 50 μm microscopically, and preferably include ups and downs (fine irregularities) equal to or smaller than 0.2 μm raised toward the surface.

The ceramic substrate to be polished is not particularly limited and may be an alumina, aluminum nitride, silicon nitride substrate or the like. Since the aluminum nitride substrate is generally formed by grains as large as several μm, grains often drop out by stress applied in a polishing operation, and this is why it is difficult to obtain a smooth surface by a conventional method, but the pressure against the surface being polished is dispersed according to the present invention, which prevents the drop out of grains caused by the concentration of the pressure, so that an even smoother polished surface results.

The polished surface formed by the polishing method according to the present invention includes substantially flat portions and recessed portions therebetween, the height of microscopical raised portions on the flat portions is small, a relatively smooth surface with a small irregularity amplitude results, and therefore when the surface is used as a sliding surface sliding on another material and/or object, a preferable sliding characteristic results. Furthermore, by positioning the ceramic substrate such that the rotation or moving direction of a workpiece is aligned or approximated to the (constant) rotation direction of the rotating body in a polishing operation, the friction resistance with the workpiece can be reduced, which allows for a higher sliding characteristic.

The sliding characteristic of a ceramic substrate according to the present invention is particularly advantageous when a workpiece to slide on is softer than the ceramic substrate, because the substantially flat portions having a small raised portion are in contact with the workpiece while sliding so that the friction resistance is small and the attacking force on the workpiece is small. For example, since a ceramic heater used in a thermal fixation device for toner image slides on a heat-resisting resin film, the ceramic substrate according to the present invention is particularly advantageously used for the substrate for the ceramic heater. Meanwhile, the recessed portion of the polished surface is preferably reduced as much as possible in order to improve the sliding characteristic. To this end, however, time required for polishing is prolonged, which impedes the productivity and therefore the time required for polishing must be set not to impede the productivity.

Figure 4:
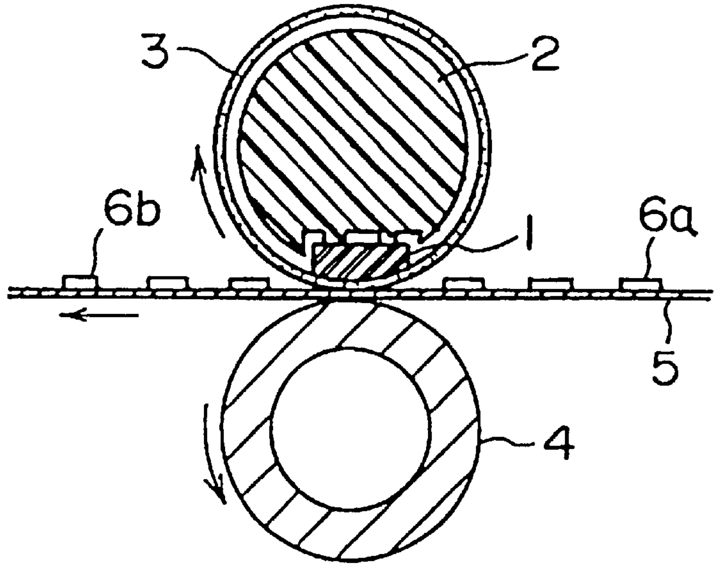
FIG. 4 is a schematic cross sectional view of a thermal fixation device for toner image using a ceramic heater.

Note that in a thermal fixation device for toner image, as shown in FIG. 4, a resin support body 2 is attached with a ceramic heater 1, a heat-resisting resin film 3 is rotatably provided at the outer circumferential portion of support body 2, and pressurizing roller 4 is disposed opposite to ceramic heater 1 with heat-resisting resin film 3 therebetween. A transfer material 5 having an unfixed toner image **6*a* is transferred at a prescribed speed between pressurizing roller 4 and heat-resisting resin film 3, pressurized by pressurizing roller 4 and heated by ceramic heater 1, so that toner image 6*b* is fixed on transfer material 5**.

First Embodiment

Ceramic powder materials $Al_2O_3$, AlN and $Si_3N_4$ were each added with a sintering aid, then an organic solvent and a binder, and mixed by a ball mill to obtain their slurries. The resultant slurries were each formed into a sheet by a doctor blade method and cut into a prescribed shape, followed by degreasing in a nitrogen atmosphere at 900° C. Then, these ceramic materials were sintered in a non-oxidizing atmosphere at optimum temperatures for them and formed into ceramic substrates.

More specifically, 5.0% by weight of CaO, $SiO_2$, and MgO were added as sintering aids to the $Al_2O_3$ material powder, and the compact thereof was sintered in air at 1800° C. and formed into an $Al_2O_3$ substrate. Three % $Y_2O_3$ by weight is added as a sintering aid to the AlN material powder, and the compact thereof was sintered in nitrogen at 1820° C. and formed into an AlN substrate. Five % $Y_2O_3$ by weight and 2.0% $Al_2O_3$ by weight were added as sintering aids to the $Si_3N_4$, and the compact was sintered in nitrogen at 1700° C. and then subjected to HIP (Hot Isostatic Pressing) under 100MPa at 1800° C. to obtain a $Si_3N_4$ substrate.

As samples of each of the ceramics thus obtained, those having different substrate sizes (length×width×thickness (mm)) and different center line average heights Ra (μm) as surface roughnesses before polishing as given in Table 1 below were prepared. The three-point bending strengths of prepared samples 1 to 6. $Al_2O_3$ substrates, samples 7 to 12, AlN substrates, and samples 13 to 18, $Si_3N_4$ substrates were 350Mpa, 350Mpa, and 900Mpa, respectively.

TABLE 1

| Sample | Ceramic | Substrate size (mm) | Surface roughness Ra (μm) |
|---|---|---|---|
| 1 | $Al_2O_3$ | 30 × 30 × 0.5 | 0.42 |
| 2 | $Al_2O_3$ | 30 × 30 × 0.3 | 0.42 |
| 3 | $Al_2O_3$ | 100 × 100 × 0.5 | 0.42 |
| 4 | $Al_2O_3$ | 100 × 100 × 0.3 | 0.42 |
| 5 | $Al_2O_3$ | 300 × 100 × 2.0 | 0.42 |
| 6 | $Al_2O_3$ | 300 × 100 × 2.5 | 0.42 |
| 7 | AlN | 30 × 30 × 0.5 | 0.85 |
| 8 | AlN | 30 × 30 × 0.3 | 0.86 |
| 9 | AlN | 100 × 100 × 0.5 | 0.79 |
| 10 | AlN | 100 × 100 × 0.3 | 0.90 |
| 11 | AlN | 300 × 100 × 2.0 | 0.83 |
| 12 | AlN | 300 × 100 × 2.5 | 0.88 |
| 13 | $Si_3N_4$ | 30 × 30 × 0.5 | 0.75 |
| 14 | $Si_3N_4$ | 30 × 30 × 0.3 | 0.64 |
| 15 | $Si_3N_4$ | 100 × 100 × 0.5 | 0.66 |
| 16 | $Si_3N_4$ | 100 × 100 × 0.3 | 0.66 |
| 17 | $Si_3N_4$ | 300 × 100 × 2.0 | 0.69 |
| 18 | $Si_3N_4$ | 300 × 100 × 2.5 | 0.70 |

Using each of the samples in Table 1, normal vibration barrel-polishing, lapping and polishing according to the present invention were performed. In the barrel-polishing, an alumina ball abrasive having a diameter of 5.0 mm and a vibrating barrel device having a container diameter of 1 m were used and the vibration was at 60Hz. In the lapping, a #600 diamond abrasive was used. In the polishing according to the present invention, #150 mesh-pass alumina abrasive grains were contained in a rotating body of nylon nonwoven fabric having a diameter of 300 mm, and the rotating body was used to perform dry polishing at a rotating speed of 1000 rev/min. A reduction in the thickness of the ceramic substrate after the polishing was intended to be not more than 0.02 mm, and the thickness given in Table 1 was set as a target.

For the thickness of the ceramic substrate obtained by each of the above polishing, center line average height Ra (μm) as a surface roughness after the polishing and a material loss (% by weight) by the polishing were measured, and the result is given in the following Table 2. Each of $Si_3N_4$ substrate samples has a bending strength greater than $Al_2O_3$ and AlN substrate samples, damages to the samples were relatively small by any of the polishing methods.

TABLE 2

| | Lapping | | Barrel-polishing | | Present invention | |
|---|---|---|---|---|---|---|
| Sample | Ra after polishing (μm) | Material loss (wt %) | Ra after polishing (μm) | Material loss (wt %) | Ra after polishing (μm) | Material loss (wt %) |
| 1 | 0.31 | 41 | 0.25 | 0.3 | 0.32 | 0.1 |
| 2 | Substrate crack | — | Edge chip | 0.5 | 0.30 | 0.1 |
| 3 | 0.31 | 40 | Substrate crack | — | 0.31 | 0.1 |
| 4 | Substrate crack | — | Substrate crack | — | 0.31 | 0.1 |
| 5 | 0.33 | 21 | Substrate crack | — | 0.29 | 0.1 |
| 6 | 0.32 | 17 | 0.28 | 0.3 | 0.27 | 0.1 |
| 7 | 0.39 | 42 | 0.28 | 0.3 | 0.29 | 0.1 |
| 8 | Substrate crack | — | Edge chip | 0.4 | 0.31 | 0.1 |
| 9 | 0.36 | 39 | Substrate crack | — | 0.29 | 0.1 |
| 10 | Substrate crack | — | Substrate crack | — | 0.30 | 0.1 |
| 11 | 0.40 | 20 | Substrate crack | — | 0.23 | 0.1 |
| 12 | 0.39 | 17 | 0.26 | 0.2 | 0.24 | 0.1 |
| 13 | 0.37 | 40 | 0.27 | 0.2 | 0.31 | <0.1 |
| 14 | 0.35 | 35 | 0.26 | 0.2 | 0.32 | <0.1 |
| 15 | 0.38 | 39 | 0.27 | 0.2 | 0.31 | <0.1 |
| 16 | Substrate crack | — | Substrate crack | — | 0.30 | <0.1 |
| 17 | 0.34 | 22 | Edge chip | — | 0.28 | <0.1 |
| 18 | 0.35 | 18 | 0.24 | 0.2 | 0.27 | <0.1 |

Based on the above result, by the barrel-polishing and lapping, cracks were generated in a thin and large substrate, while by the polishing according to the present invention, deformation at a corner portion. rounding, and chipping, not to mention cracks in the substrates were not caused, and still a better surface roughness resulted, particularly for a silicon nitride substrate as compared to the other polishing methods.

When the material loss in the substrate is compared, reduction in the thickness of the ceramic substrate according to the present invention is from 4 μm to 6 μm at most, in other words, thee was little material loss, while the material loss was great according to the conventional methods, particularly according to the lapping.

Second Embodiment

Using sample 10, an AlN substrate according to the first embodiment, improvements in the surface roughness by multi-step polishing were observed. More specifically, in each of the steps, alumina abrasive grains were contained in a rotating body of nylon nonwoven fabric having a diameter of 300 mm, and polishing was performed at a rotating speed of 1000 rev/min. In the multi-step polishing, a rotating body containing #150 mesh-pass was used first, then the grain size of abrasive grains was reduced stepwise to #320 mesh-pass, then to #600 mesh-pass and then to #1000 mesh-pass. Center line average height Ra was measured as the surface roughness of a substrate obtained in each step, and the result is given in the following Table 3.

For the purpose of comparison, the same sample 10, an AlN substrate was polished by rotating bodies containing #320 mesh-pass, #600 mesh-pass and #1000 mesh-pass alumina grains, and then again polished using rotating bodies containing alumina grains of larger sizes, in other words, 150# mesh-pass, #320 mesh-pass and #600 mesh-pass alumina abrasive grains. The center line average height Ra of each of the resulting substrates was measured as the surface roughness, and the result is given as the surface roughness Ra after the polishing in the following Table 3.

TABLE 3

| Abrasive grain size | Surface roughness before polishing Ra(μm) | Surface roughness after polishing Ra(μm) | Surface roughness after re-polishing Ra(μm) |
|---|---|---|---|
| #150 | 0.90 | 0.30 | — |
| #320 | 0.30 | 0.21 | 0.28 |
| #600 | 0.21 | 0.15 | 0.20 |
| #1000 | 0.15 | 0.12 | 0.15 |

As can be seen from the result, in the multi-step polishing, a rotating body containing abrasive grains smaller step wise than that in the previous stage is used for polishing, so that the surface roughness of the polished surface can be further improved.

Third Embodiment

Using sample 10, as AlN substrate according to the first embodiment, polishing was performed at different angles θ between the advancing direction of the AlN substrate (the polishing direction) and the rotating direction of the rotating body, and the influence of angle θ upon the surface roughness of the resulting polished surface was observed. The polishing conditions were the same as those of the first embodiment except that the rotating body used contained #150 mesh-pass alumina abrasive grains.

TABLE 4

| Angle θ (°) | Surface roughness before polishing Ra (μm) | Surface roughness after polishing Ra (μm) |
|---|---|---|
| 0 | 0.90 | 0.30 |
| 5 | 0.90 | 0.29 |
| 10 | 0.90 | 0.24 |
| 30 | 0.90 | 0.18 |
| 45 | 0.90 | 0.16 |
| 60 | 0.90 | 0.17 |
| 80 | 0.90 | 0.25 |
| 90 | 0.90 | 0.32 |

As in the above Table 4, changing angle θ formed between the rotating direction of the rotating body and the polishing direction of the substrate changes the surface roughness, and the surface roughness Ra of the AlN substrate after polishing is significantly reduced when angle θ is in the range from 10° to 80°, more preferably in the range from 30° to 60° than when the angle is 0° (in parallel) and 90° (at right angles).

Fourth Embodiment

Similarly to the first embodiment, an AlN substrate having a length of 300 mm, a width of 10 mm and a thickness of 1.0 mm and an AlN substrate having a length of 100 mm, a width of 300 mm and a thickness of 1.3 mm were manufactured. The following polishing operations were performed to these AlN substrates.

The AlN substrate as thick as 1.0 mm was wet-polished using a nylon sponge rotating body containing SiC abrasive grains having a diameter of 400 mm at a rotating speed of 800 rev/min while applying water to the rotating body. More specifically, angle θ formed between the rotating direction and the polishing direction was 30°, and the grain size of abrasive grains was changed from #150 mesh-pass, to #320, #600 and to #1000 mesh-pass stepwise for multi-step polishing.

Meanwhile, the AlN substrate as thick as 1.3 mm was polished to 1.0 mm by lapping and cut into a piece of 300 mm×10 mm.

Figure 5:
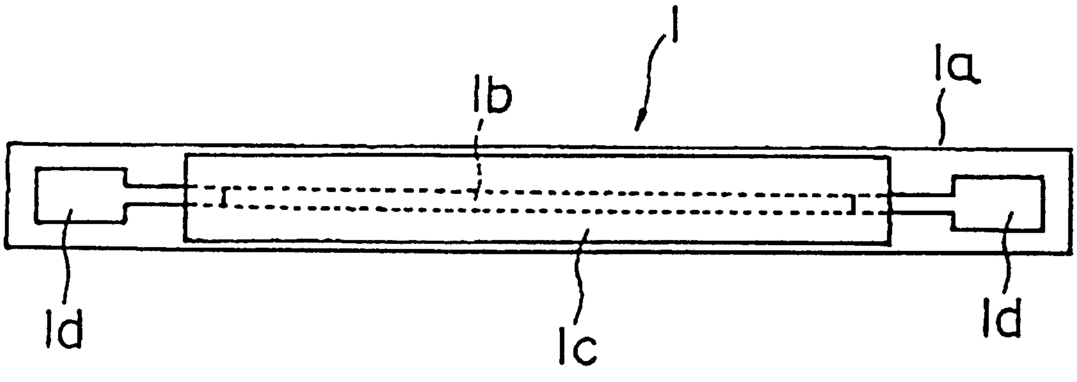
FIG. 5 is a schematic plan view of a ceramic heater used in a thermal fixation device for toner image.

Each of the AlN substrate after polishing was used to a manufacture a ceramic heater 1 used in a thermal fixation device for toner image as shown in FIG. 5. More specifically, a heating element 1*b* was formed by Ag-Pd paste by screen printing and an electrode 1*d* was formed by Ag paste at the polishing surface of each ceramic substrate 1*a,* followed by baking in atmosphere at 880° C. then, glass paste was applied onto heating element 1*b* by screen printing, followed by baking at 700° C. in atmosphee to form a protection film 1*c*.

Ceramic heaters 1 thus obtained were each attached to a thermal fixation device for toner image as shown in FIG. 4 and its durability was tested. In the durability testing, the temperature of ceramic heater 1*c* was set to 180° C., and the rotation speed of pressurizing roller 4 and heat-resisting resin film 3 was set to 40 rev/min.

As a result, in the ceramic heater using the AlN substrate polished according to the present invention, there were no grains that became loose and dropped out between the heat-resisting resin film and the heater after 1000 hours, good sliding characteristic was secured, and no change was observed in the rotating speed of the heat-resisting film from the speed at the start of the durability test.

Meanwhile, in the ceramic heater using the lapped AlN substrate, the heat-resisting resin film stopped rotating after 150 hours since the start of the durability test. Observing the sliding surface between the heat-resisting resin film and the heater revealed that loosened and removed AlN grains were present which probably impaired the sliding ability and stopped the rotation of the heat-resisting film.

As in the forgoing, according to the present invention, a ceramic substrate having a small thickness and a large area can be easily and inexpensively polished without damages such as cracks to produce a polished surface having high smoothness. The invention is particularly suitable for polishing an aluminum nitride substrate, grains of which easily depart. An aluminum nitride substrate polished according to the present invention is particularly preferably used as a substrate for a ceramic heater in a thermal fixation device for toner image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A ceramic substrate comprising at least a polished surface, said polished surface including at least two substantially flat portions and a recessed portion between said substantially flat portions, where said flat portions respectively include microscope recesses and microscopic protrusions, said polished surface has a surface roughness of at most 0.34 μm, said substantially flat portions each have a respective width of at most 50 μm, and said substrate has a thickness of at most 2 mm.

2. The ceramic substrate as recited in claim 1, wherein said ceramic substrate is an aluminum nitride substrate.

3. The ceramic substrate as recited in claim 1, wherein said ceramic substrate is a substrate for a ceramic heater in a thermal fixation device for fixing a toner image.

4. The ceramic substrate as recited in claim 1, wherein said surface roughness is a centerline average roughness height Ra which is at least 0.12 μm.

5. The ceramic substrate as recited in claim 1, wherein said surface roughness is a center line average roughness height Ra which is less than 0.30 μm.

6. The ceramic substrate as recited in claim 5, wherein said polished surface further has a maximum roughness height Rmax of not greater than 1.5 μm.

7. The ceramic substrate as recited in claim 6, wherein said substrate has length and width dimensions respectively of at least 100 mm.

8. The ceramic substrate as recited in claim 7, wherein said thickness of said substrate is at most 0.5 mm.

9. The ceramic substrate as recited in claim 1, wherein said respective width of each respective one of said substantially flat portions is in a range of at least several μm to at most 50 μm.

10. The ceramic substrate as recited in claim 9, wherein said microscopic recesses and microscopic protrusions have recess depths and protrusions heights of not more than 0.2 μm respectively.

11. The ceramic substrate as recited in claim 1, wherein said microscopic recesses and microscopic protrusions have recess depths and protrusion heights of not more than 0.2 μm respectively.

12. The ceramic substrate as recited in claim 1, wherein said thickness of said substrate is at most 0.5 mm.

13. The ceramic substrate as recited in claim 1, wherein said substrate has length and width dimensions respectively of at least 100 mm.

14. The ceramic substrate as recited in claim 1, wherein said polished surface further has a maximum roughness height Rmax of not greater than 1.5 μm.

15. The ceramic substrate as recited in claim 1, wherein said polished surface has been formed by polishing with a circumferential edge of a rotating ductile abrasive body.

16. A thermal fixation device for fixing a toner image on a transfer sheet, said device comprising:

a ceramic heater including said ceramic substrate according to claim 1, and a heating element provided on said polished surface of said ceramic substrate;

an endless loop of a heat-resistant resin film arranged around said ceramic heater and in contact with said polished surface of said ceramic substrate; and a pressure roller arranged adjacent to said polished surface of said ceramic substrate with said endless loop of said resin film therebetween.

* * * * *